United States Patent
Miedema et al.

(10) Patent No.: US 12,236,085 B2
(45) Date of Patent: Feb. 25, 2025

(54) APPARATUSES AND METHODS FOR FACILITATING A PRESERVATION OF MEMORY VIA A SCHEMA-BASED APPROACH

(71) Applicant: CIENA CORPORATION, Hanover, MD (US)

(72) Inventors: David Miedema, Ottawa (CA); Hadiuzzaman Dewan, Stittsville (CA)

(73) Assignee: CIENA CORPORATION, Hanover, MD (US)

( * ) Notice: Subject to any disclaimer, the term of this patent is extended or adjusted under 35 U.S.C. 154(b) by 149 days.

(21) Appl. No.: 18/168,614

(22) Filed: Feb. 14, 2023

(65) Prior Publication Data
US 2024/0272792 A1    Aug. 15, 2024

(51) Int. Cl.
*G06F 3/06* (2006.01)

(52) U.S. Cl.
CPC .......... *G06F 3/0604* (2013.01); *G06F 3/0623* (2013.01); *G06F 3/0653* (2013.01); *G06F 3/0674* (2013.01)

(58) Field of Classification Search
CPC .... G06F 3/0674; G06F 3/0604; G06F 3/0653; G06F 3/0623
See application file for complete search history.

(56) References Cited

U.S. PATENT DOCUMENTS

| | | | | |
|---|---|---|---|---|
| 2010/0174804 A1* | 7/2010 | Sonoyama | .......... | H04L 67/1095 709/224 |
| 2015/0378913 A1* | 12/2015 | Jouppi | ................ | G06F 12/0844 711/119 |
| 2017/0031939 A1* | 2/2017 | Wenzel | ................ | G06F 16/1727 |
| 2018/0225177 A1* | 8/2018 | Bhagi | .................... | G06F 16/164 |
| 2018/0253467 A1* | 9/2018 | Gurajada | ............ | G06F 11/1471 |
| 2019/0018820 A1* | 1/2019 | Lee | ......... | G06F 15/161 |
| 2019/0114337 A1* | 4/2019 | George | ................ | G06F 16/902 |

* cited by examiner

*Primary Examiner* — Jane W Benner
(74) *Attorney, Agent, or Firm* — Guntin & Gust, PLC; Mark Wilinski (57) ABSTRACT

Aspects of the subject disclosure may include, for example, identifying a plurality of parameters for managing data in relation to an execution of an application, monitoring access to the data, determining, based on the monitoring, that first data that is located in a memory of the processing system has not been accessed in an amount of time that is greater than a first threshold, resulting in a first determination, determining, based on the plurality of parameters and the first determination, that the first data is a candidate for transfer to a persistent storage device, resulting in a second determination, and based on the second determination, causing the first data to be transferred to the persistent storage device. Other embodiments are disclosed.

20 Claims, 3 Drawing Sheets

APPARATUSES AND METHODS FOR FACILITATING A PRESERVATION OF MEMORY VIA A SCHEMA-BASED APPROACH

FIELD OF THE DISCLOSURE

The subject disclosure relates to apparatuses and methods for facilitating a preservation of memory via a schema-based approach.

BACKGROUND

Configuration and operational data associated with an execution of services or microservices tends to be dynamic in nature. For example, the data may be modeled as a hierarchical tree, where nodes of the tree correspond to values of the data and branches of the tree correspond to relationships between the nodes. In many instances, a service/microservice is facilitated via an execution of an application. The application may access the data at different rates, which is to say that the data (or, analogously, the various parts/portions of the tree) might not be accessed in equal amounts over a given time frame.

Conventionally, first data that is frequently accessed may be stored in a cache, second data that is less frequently accessed than the first data may be stored in a memory device (e.g., a random access memory [RAM]), and third data that is less frequently accessed than the second data may be stored in a persistent storage device (e.g., a disk or hard disk). An operating system (OS) may facilitate the management of the data in terms of where the data is located. For example, an OS may map virtual addresses associated with the data of a tree to physical addresses of the memory device. Further, the addresses of the memory device may be arranged/organized as pages (e.g., a first set of addresses may correspond to a first page, a second set of addresses may correspond to a second page, and so on). A movement or mapping of data between the memory device and the persistent storage device may occur on page boundaries, which is to say that an entire page may be moved from the memory device to the persistent storage device (or vice versa). This whole-page approach in respect of the management of the data may lead to inefficiencies due to the dynamic conditions or circumstances that may drive a service/microservice or application requiring part of the data associated with a page. Still further, other items of data may be combined or intermingled with the data of the service/microservice or application in the memory device, which may result in even further complexities or inefficiencies.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for enhancing efficiencies associated with managing data. For example, aspects of this disclosure may reduce a memory footprint of operational or configuration data that is organized as a tree or other schema. By identifying a part of the data that is stale (e.g., a part that has not been accessed in an amount of time that is greater than a threshold), that part may be provided to persistent or long-term storage, thereby reducing an active, in-memory footprint of that part.

One or more embodiments of this disclosure may include, in whole or in part, identifying a plurality of parameters for managing data in relation to an execution of an application; monitoring access to the data; determining, based on the monitoring, that first data that is located in a memory of the processing system has not been accessed in an amount of time that is greater than a first threshold, resulting in a first determination; determining, based on the plurality of parameters and the first determination, that the first data is a candidate for transfer to a persistent storage device, resulting in a second determination; and based on the second determination, causing the first data to be transferred to the persistent storage device.

One or more embodiments of this disclosure may include, in whole or in part, monitoring, by a processing system including a processor, access to data that is related to a provisioning of a service or a microservice; determining, by the processing system and based on the monitoring, that first data of the data that is associated with an access attempt is resident in a storage device that is external to the processing system, resulting in a first determination; determining, by the processing system and based on the first determination, that second data of the data is a descendent of the first data, resulting in a second determination; and based on the second determination, causing, by the processing system, the first data and the second data to be transferred from the storage device to a memory of the processing system.

One or more embodiments of this disclosure may include, in whole or in part, determining that an access attempt is not attempted with respect to first data associated with an execution of an application within a first threshold amount of time, resulting in a first determination; determining, based on the first determination, that a policy associated with the application requires the first data to be retained in the memory, resulting in a second determination; causing, based on the second determination, the first data to be retained in the memory; determining that an access attempt is not attempted with respect to second data associated with the execution of the application within a second threshold amount of time, resulting in a third determination; determining, based on the third determination, that the policy does not require the second data to be retained in the memory, resulting in a fourth determination; and transferring, based on the fourth determination, at least the second data to a storage device that is external to the processing system for storage.

As described herein, an access of data may correspond to one or more operations that may be performed in respect of the data. For example, a read operation may cause the data to be read from a given location, whereas a write operation may cause the data to be written to a given location. In some embodiments, one or more independent timers/timeouts may be maintained for each type or kind of operation (e.g., a read operation may be associated with a first timer, whereas a write operation may be associated with a second timer). In some embodiments, a single timer may be used to monitor whether data was/has been accessed, irrespective of the type/kind of operation that has been performed.

In some embodiments, a path-based application programming interface (API) or algorithm may be used. For example, the API/algorithm may intercept access to data in respect of, e.g., a tree-based structure/representation of the data. The API/algorithm may record or maintain values associated with the access. The API/algorithm may be operative on one or more portions of the data. For example, aspects of this disclosure may be selectively applied to an entire structure/representation or only parts/portions thereof (e.g., less than an entirety of a tree or other structure/representation). In some embodiments, parts/portions of a structure (e.g., a tree) may be represented using one or more notations, such as an Xpath notation or syntax.

Based on a determination that data has been accessed, the API/algorithm may determine a location of the data and a state (e.g., a swap-state) of the data (or associated branch) in a hierarchy. If the data that has been accessed (or is being accessed) is located in persistent or long-term storage a copy of that data (and any other data that is an indirect or direct descendant of that data, such as a child of the data, a grandchild of the data, a great grandchild of the data, etc.) may be transferred to, e.g., a cache or memory device. Similar logic may be applied in respect of transferring data from a cache or memory device to persistent or long-term storage. For example, if a given item of data located in a cache or memory device has not been accessed for a threshold amount of time, a copy of that data (and any other data that is an indirect or direct descendant of the data) may be transferred to persistent or long-term storage and resources that had been consumed/utilized as part of maintaining the copy of the data (and any descendants) in the cache or memory device may be freed, released, or reallocated for other uses. A formatting of data may include serializing the data, generating a revised version of the data, etc. In some embodiments, formatted data may be maintained as part of a relational schema; for example, a revised version may be a descendant of an original version.

Relationships between items of data may be maintained as part of one or more structures or representations of the data. In this manner, as an item of data (or a copy thereof) is moved/transferred from one device or entity to another device or entity, the relationship between the data may be maintained/preserved. Thus, data integrity and coherency may be realized/obtained in accordance with aspects of this disclosure. Further, aspects of this disclosure may be data-type aware. For example, data that is sensitive in nature (such as for example, personal information associated with a user or a subscriber to a service) might not be a candidate for transfer from a first device to a second device, or may be subjected to encryption prior to the transfer being initiated or undertaken.

Figure 1:
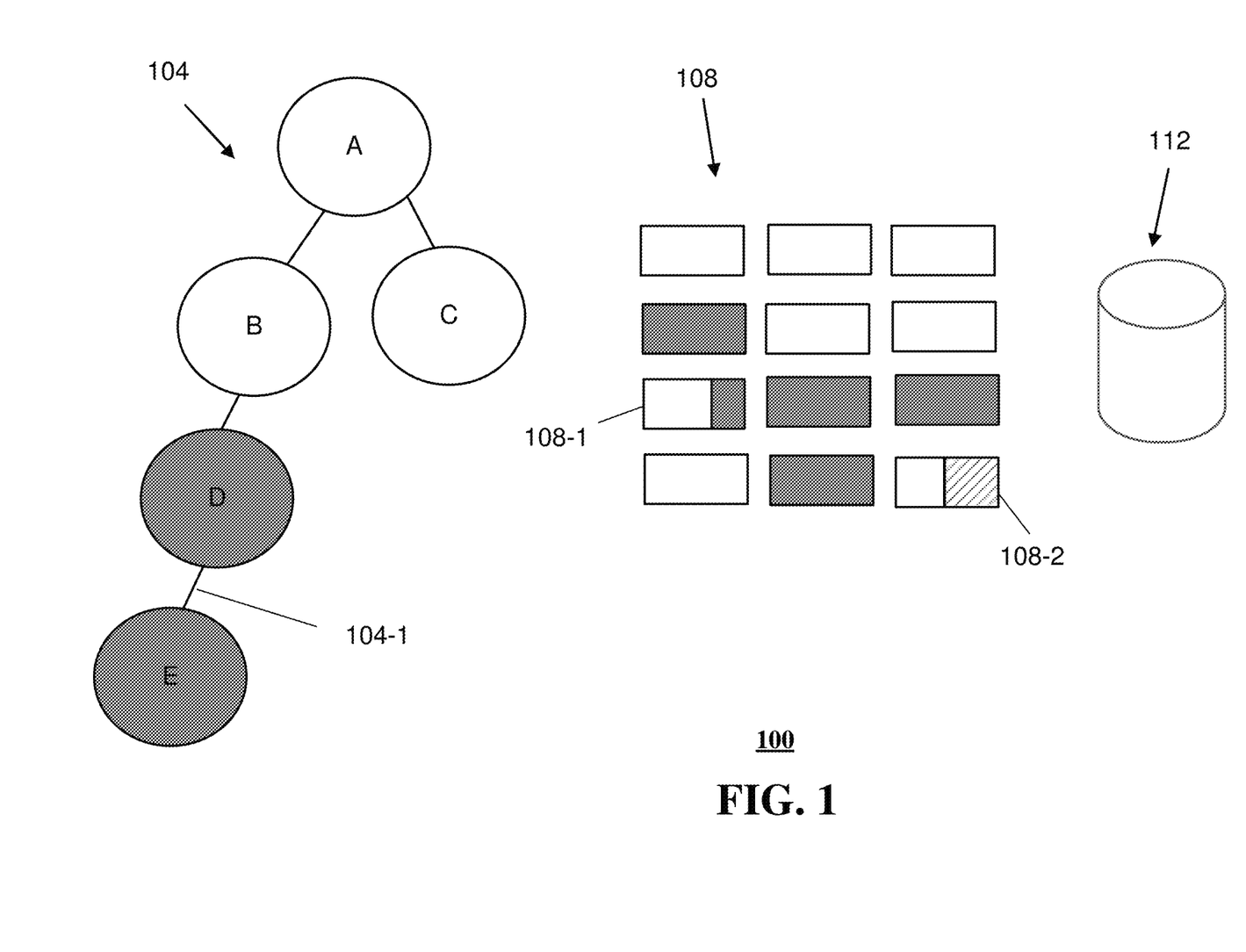
FIG. 1 shows an example, non-limiting embodiment of a system in accordance with various aspects described herein.

To demonstrate certain aspects of the foregoing, reference may be made to FIG. 1, which depicts a system 100 in accordance with various embodiments of this disclosure. The system 100 may include a schema or other representation of data, such as a tree 104, a memory device (modeled/represented as a plurality of locations 108), and a persistent storage (modeled/represented as a database or disk 112). Thus, the system 100 is shown at three levels or tiers (where each level or tier is represented by one of the three reference characters 104, 108, and 112). One skilled in the art will appreciate that more or fewer than three levels/tiers may be used in a given embodiment; in this respect, it is appreciated that the system 100 is illustrative.

The tree 104 (which may be representative of a portion of a cache) is shown as including a number of nodes, illustratively denoted as nodes A, B, C, D, and E. The nodes A through E may be representative of data values associated with a service/microservice or an application. Links or branches between various ones of the nodes A through E may be representative of a relationship, a parameter, or the like, involving the nodes. For example, a link/branch 104-1 may be representative of a relationship or parameter involving the nodes D and E. Based on the link/branch 104-1, a relationship may be defined or established between the nodes D and E. For example, and from a perspective of a top-down flow, the node E may be referred to as a child of the node D. In a similar manner/fashion, the nodes B and C may be referred to as children of the node A. In the context of an application, a second node that is a descendant of a first node may correspond to a feature set of the first node. For example, and assuming that the first node pertains to capabilities associated with presenting information, the second node may correspond to audio capabilities.

The nodes A through E (and potentially any relationships between the nodes) may be represented in the tree 104 using a first address scheme (e.g., virtual addresses). In contrast, a second address scheme (a physical, page-based, or boundary-based address scheme) may be used as part of the memory device 108. Thus, in some embodiments an address translation (AT) may be used to map from the first address scheme to the second address scheme (or vice versa).

As described above, the memory device 108 may be represented as, or include, one or more locations. For example, the locations of the memory device 108 are illustratively shown as rectangles that are arranged in a row-and-column format. More specifically, the memory device 108 is shown in FIG. 1 as including four rows and three columns of locations, with the understanding that in some embodiments the particular arrangement of the locations may be different from what is shown. The locations of the memory device 108 may be used to store data, such as for example data associated with the tree 104. For example, data associated with unshaded nodes A through C of the tree may be stored in a subset of the locations of the memory device 108 (corresponding to unshaded blocks/locations within 108), and data associated with the shaded nodes D and E may be stored in another subset of the locations of the memory device 108 (corresponding to shaded blocks/locations within 108).

Two of the locations of the memory device 108 are denoted by reference characters 108-1 and 108-2 in FIG. 1. The location 108-1 is denoted with both an unshaded portion and a shaded portion, signifying that data stored at that location may correspond to a combination of data that is mapped to more than one of the nodes of the tree 104, such as the nodes B and D. The location 108-2 is denoted with both an unshaded portion and a patterned-portion (e.g., diagonal lines are used as a fill for the patterned-portion in FIG. 1), signifying that data stored at that location may correspond to a combination of data that is mapped to the tree 104 (such as, for example, the node C of the tree 104) and data that is not associated with the tree 104. For example, it may be the case that the data associated with the patterned-portion of the location 108-2 may be associated with another/different tree or other data structure/schema, potentially even another/different tree or other data structure/scheme that is associated with a different service/microservice or application.

In some embodiments, metadata may be managed/maintained to drive determinations as to whether data (or a copy thereof) should be transferred from a first entity (e.g., the memory device 108) to another entity (e.g., the persistent storage 112). For example, Table 1 shown below is representative of a subset of metadata that may be associated with the system 100 of FIG. 1.

TABLE 1

Metadata For Managing Data Of, Or Transactions Within, The System 100

| Branch | Status | Type | Access Time | Swap Timeout |
|---|---|---|---|---|
| A/B/D/E | Memory | Unencrypted | 0 minutes ago | 20 minutes |
| A/C | Persistent Storage | Encrypted/ Compressed | 8 minutes ago | 4 minutes |

In Table 1, the first column (Branch) may be representative of a chain of the tree 104. As the nomenclature implies, the first chain shown in Table 1 (A/B/D/E) may be representative of the data associated with the nodes A, B, D, and E. Similarly, the second chain of Table 1 (A/C) may be representative of the data associated with the nodes A and C.

The second column (Status) of Table 1 may be indicative of where the data is currently located or maintained. Thus, for example, the data associated with nodes A, B, D, and E may be located in the memory device 108, whereas the data associated with the nodes A and C may be located in the persistent storage 112.

The third column (Type) of Table 1 may be indicative of parameters that may be applied to the respective data. For example, the data associated with nodes A, B, D, and E may be unencrypted, whereas the data associated with the nodes A and C may be encrypted and compressed. The status of unencrypted, encrypted, and compressed are exemplary; other types or kinds of statuses or parameters may be used in some embodiments.

The fourth column (Access Time) of Table 1 may refer to the last time that the respective data was accessed. Thus, the data associated with nodes A, B, D, and E may have been accessed 0 minutes ago (e.g., less than 30 second ago, using an approach of rounding to the nearest whole minute), whereas the data associated with nodes A and C may have been accessed approximately 8 minutes ago. It may be the case that an access (e.g., a read operation) was just invoked by an application in respect of the data associated with the node E, thus explaining the value of 0 minutes in Table 1.

The fifth column (Swap Timeout) of Table 1 may refer to a threshold amount of time before the respective data is deemed stale and is a candidate for transfer to, e.g., persistent storage. Thus, the data associated with nodes A, B, D, and E may have an associated threshold of 20 minutes, whereas the data associated with the nodes A and C may have an associated threshold of 4 minutes. The difference in thresholds may be based on any number of factors or considerations, such as for example the data associated with the nodes A, B, D, and E being representative of a core or semi-important functionality of an application and the data associated with the nodes A and C being associated with a tangential or incidental feature of the application.

In some embodiments, separate thresholds may be used for different types or kinds of operations. For example, a read operation in respect of a data item may utilize a first swap timeout threshold and a write operation in respect of the data item may utilize a second swap timeout threshold that is different from the first swap timeout threshold. Thus, it is appreciated that the use of a single swap timeout threshold for a given chain shown in Table 1 is illustrative. More generally, other types or kinds of criteria (beyond time-based criteria) may be used in some embodiments. For example, an indication of a sensitivity or criticality of the data item may be analyzed, potentially on a sliding or relative scale, in establishing thresholds that may be used.

Figure 2:
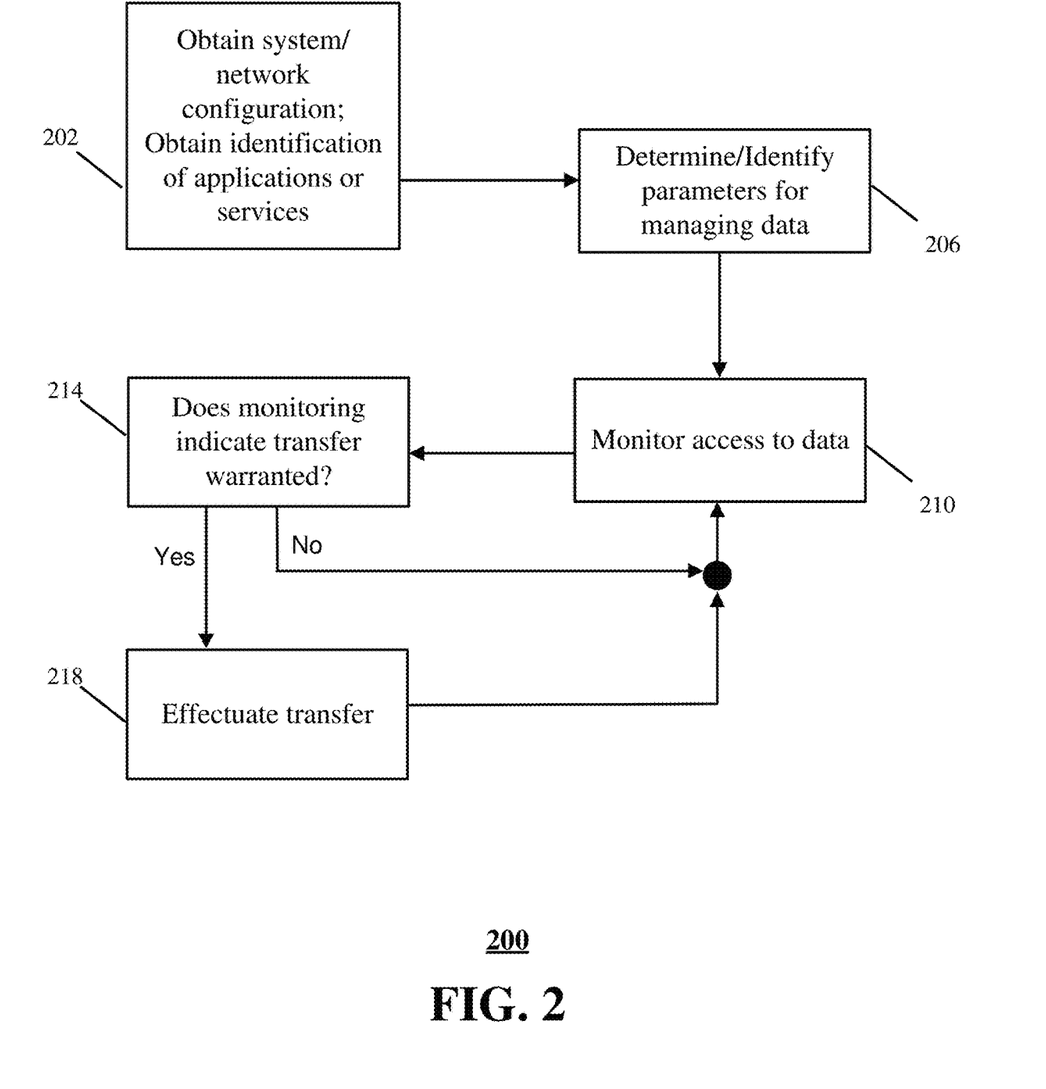
FIG. 2 shows an example, non-limiting embodiment of a method in accordance with various aspects described herein.

Referring now to FIG. 2, an illustrative embodiment of a method 200 in accordance with various aspects of this disclosure is shown. The method 200 may be implemented (e.g., executed), in whole or in part, in conjunction with one or more systems, devices, and/or components, such as for the example the systems, devices, and components set forth herein. In some embodiments, the method 200 may be implemented, in whole or in part, in conjunction with one or more processing systems. A processing system that may be used may include one or more processors.

Various operations of the method 200 are described in further detail below in relation to the blocks of the method 200. It is appreciated that some of the blocks (or associated operations) may be optional in a given embodiment. Further, the blocks (or associated operations) may execute in an order or sequence that is different from what is shown in FIG. 2. In some embodiments, additional blocks or operations not explicitly shown may be included. Any and all of the aforementioned modifications or adaptations to the method 200 are included as part of this disclosure.

In block 202, a system or network configuration may be obtained. For example, as part of block 202, one or more platforms or entities that may be used for storing or managing data may be identified. To demonstrate, aspects of the block 202 may include an identification of a type or kind of (local) memory device (e.g., RAM) that is included in the system (see FIG. 1: memory device 108), a type or kind of persistent or long-term storage (e.g., disk, database, etc.) that is included in the system (see FIG. 1: persistent storage 112), etc. The block 202 may include an identification or one or more applications or services that are to be supported by the system or network.

In block 206 one or more parameters (or associated values) for managing data associated with the application(s)/service(s)/microservice(s) identified in block 202 may be determined or identified. For the example, the parameters may be determined/identified in block 206 based on the platforms/entities identified as part of block 202. In some embodiments, the parameters may be included as part of a specification or a requirement associated with the application(s)/service(s)/microservice(s). In some embodiments, the parameters may be based at least in part on a user-generated input. In some embodiments, the parameters may be obtained in accordance with an execution of one or more algorithms. To demonstrate, algorithms incorporating machine learning or artificial intelligence technologies may be utilized to identify the parameters (or associated values) to use.

In block 210, access to data associated with the application(s)/service(s)/microservice(s) may be monitored (potentially subject to an opt-in or opt-out provision to satisfy, or adhere to, privacy or security considerations). For example, a probe or other monitoring device/entity may be utilized to sample or otherwise monitor data access transactions (or, analogously, a lack of data access transactions). Block 210 may include a generation of a log, report, message, or the like, to capture/record status of the data accesses.

In block 214, a determination may be made whether the monitoring (of block 210) indicates that a transfer of one or more items of data is warranted. For example, an attempt to access data that is resident in the persistent storage may indicate that a transfer of (a copy of) the data (and potentially any other data that is a descendant of that data) from the persistent storage to the (local) memory device to facilitate the access is warranted. Conversely, if data that is resident in the (local) memory device is stale (potentially in conjunction with other considerations), block 214 may provide/indicate that such data is a candidate for transfer/removal to the persistent storage.

If block 214 results in a determination that no transfer is warranted, flow may proceed from block 214 to block 210. In this respect, a loop (e.g., a closed loop) may be formed between blocks 210 and 214 to continue monitoring for changes in conditions or circumstances, while allowing operations to proceed under a current framework in an absence of such changes or conditions. Conversely, if block 214 results in a determination that a transfer is warranted, flow may proceed from block 214 to block 218.

In block 218, transfer operations may be effectuated based on the determination(s) of block 214. For example, block 218 may include a transfer of data from the persistent storage to the (local) memory device (or vice versa). To the extent that data is transferred from the (local) memory device to the persistent storage as part of block 218, the data may be serialized into one or more formats (e.g., a binary format) for storage in the persistent storage and resources associated with the (local) memory device that are/were used to store/maintain the data may be released/freed. To the extent that data is transferred from the persistent storage to the (local) memory device as part of block 218, any relationship of that data in connection with other data (such as other data included as part of a tree or other structure) may be restored to ensure coherency and integrity in operations. From block 218, flow may proceed to, e.g., block 210 to continue monitoring access to the data.

Thus, as set forth above, aspects of this disclosure may provide for a granular control on whether, and to what extent, data included as part of a structure or schema may be transferred from a first device or entity (e.g., a [local] memory device) to a second device or entity (e.g., a persistent or long-term storage). In some embodiments, parameters or settings that facilitate such control may be modified based on a detection of changes in circumstances or conditions. To take an illustrative example, a change in preferences amongst a group of users or subscribers to a service associated with an application may dictate a change in policies, such as a policy pertaining to an allocation of data amongst the first device/entity relative to the second device/entity.

In some embodiments, access to data may be monitored to enhance an efficiency of resources that may be used to store the data and/or access the data. For example, during a sub-tree access, related swapped sub-branches may be identified and restored to the tree from, e.g., a persistent storage. Other swapped branches or sub-branches might not be impacted, thereby enhancing an operational lifetime of the persistent storage.

Aspects of this disclosure, inclusive of the monitoring described above, may facilitate a collection of statistics. The statistics may be analyzed to detect or identify patterns in use or access, which may facilitate further insight and optimization capabilities/functionalities.

Aspects of this disclosure may leverage information that is innate to (an execution of) an application. For example, whereas conventional technologies (inclusive of one or more OSs) may tend to treat all data substantially equally, aspects of this disclosure may identify/distinguish data along one or more paradigms or parameters and may afford disparate treatment to the data in accordance therewith. For example, and as discussed above, data that is sensitive in nature (e.g., user information) may be afforded different treatment relative to data that is less sensitive or insensitive in nature (e.g., general instructional information for using an application). Similarly, data that is critical or core to an execution of an application or a provisioning of a service/microservice (e.g., access to media) may be treated differently from data that is tangential or supplemental to the execution of the application/service/microservice (e.g., an identification of a widget or icon represented via a particular color).

While some of the examples set forth above pertained to a tree, one skilled in the art will appreciate that aspects of this disclosure may be applied to other data structures, schema (e.g., relational schema), and the like. For example, aspects of this disclosure may be leveraged in connection with flat schemas (e.g., a tree with no branches), relational databases (e.g., sets of schema based on flat tables connected via relationships), etc. A use of a schema as set forth herein may break any dependence on underlying hardware or OSs, thereby facilitating enhanced flexibility in terms of data storage and management operations.

As set forth above, aspects of this disclosure may generate useful, concrete, and tangible results. Aspects of this disclosure may be implemented in conjunction with one or more specifically/specially programmed machines or apparatuses to obtain/realize such results. Further, as would be appreciated by one of skill in the art, aspects of this disclosure are transformative in nature, as resources that are used to store or otherwise manage data may be allocated to more productive or efficient uses relative to conventional technologies. In this respect, aspects of this disclosure may be included or integrated as part of numerous practical applications pertaining to data management and storage. Further, as demonstrated herein, aspects of this disclosure represent substantial improvements relative to conventional technologies. It suffices to say that the various aspects of this disclosure are not directed to abstract ideas. To the contrary, the various aspects of this disclosure are directed to, and encompass, significantly more than any abstract idea standing alone.

Figure 3:
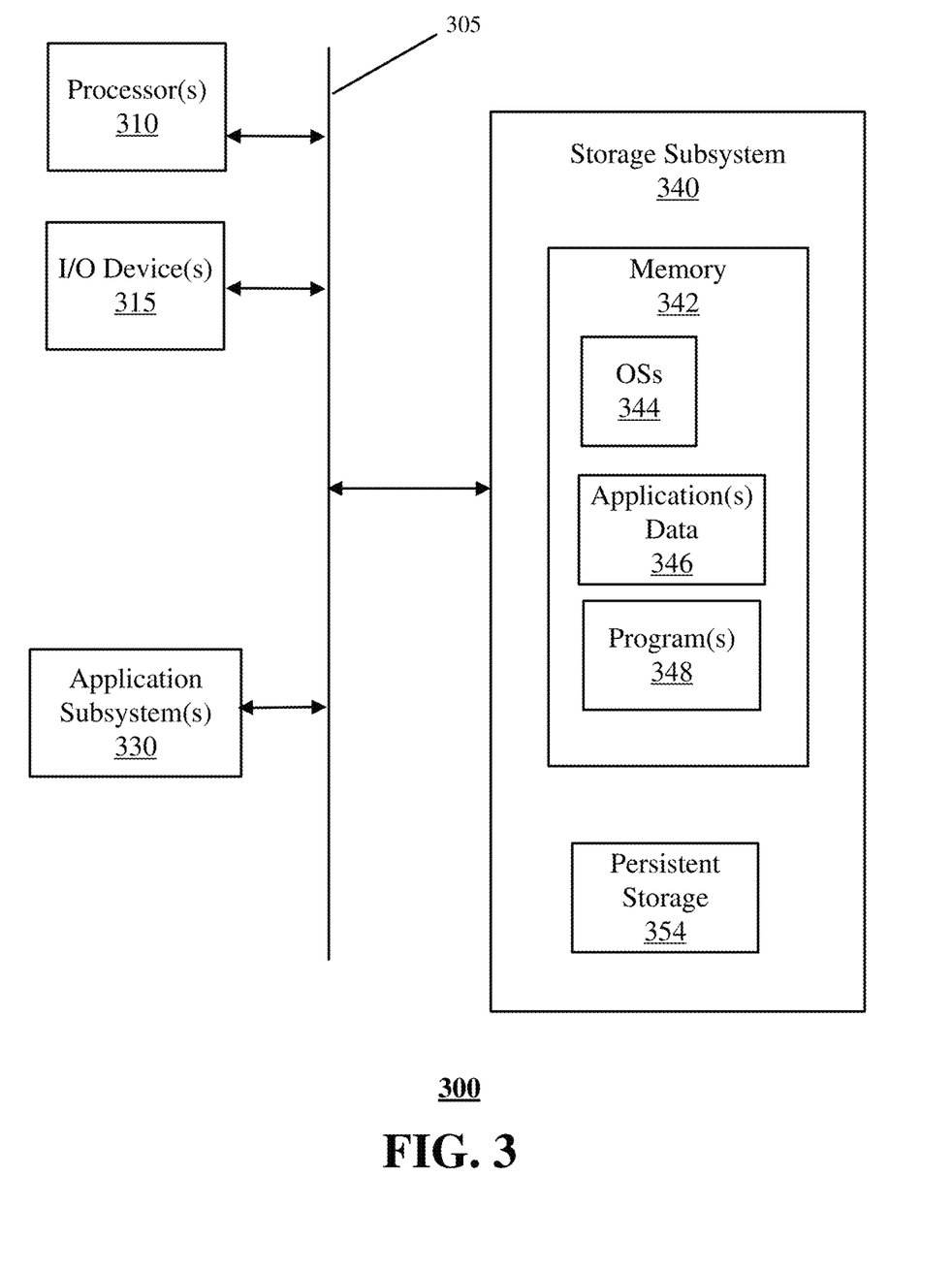
FIG. 3 shows an example, non-limiting embodiment of a processing system in accordance with aspects described herein.

Referring now to FIG. 3, a simplified block diagram of a processing system 300 is shown. In some embodiments, the processing system 300 is configured to implement any of the methods/methodological acts/operations described above. For example, the processing system 300 may manage data transfer and storage operations associated with an application or service/microservice.

The processing system 300 may be included or incorporated as part of various types of components, devices, systems, networks, or the like. For example, and without limitation, aspects of the processing system 300 may be included as part of a personal computer, a portable computer, a workstation, a network computer, a server, a router, a gateway, a switch, a mainframe computer, a kiosk, a PDA, a cellphone, a smartphone, or any other data processing system. Due to the ever-changing nature of computers and networks, the description of the processing system 300 depicted in FIG. 3 is intended as a specific example for the sake of illustration. Many other configurations having more or fewer components than the system depicted in FIG. 3 are possible and within the scope and spirit of this disclosure.

The system 300 is shown comprising hardware elements that can be electrically coupled via a bus 305. The hardware elements may include one or more processors 310, one or more input/output (I/O) devices 315, and/or one or more application subsystems 330. Bus 305 provides a mechanism for letting the various components and subsystems of the processing system 300 to communicate with each other. Although the bus 305 is shown schematically as a single bus, alternative embodiments of the bus may utilize multiple busses. The bus 305 may be implemented using a wired/wireline link and/or a wireless link.

The processors 310 represent the processing resources of the processing system 300 and may include without limitation one or more general-purpose processors and/or one or more special-purpose processors (such as digital signal processing chips, graphics acceleration processors, and/or the like). Processors 310 may include one or more multicore processors.

The I/O devices 315 may include one or more different mechanisms for providing inputs to the processing system 300 such as, without limitation, a mouse, a keyboard, a touchpad, a tablet, and/or the like. The I/O devices 315 may include one or more different mechanisms for generating and providing outputs (e.g., information) from the processing system 300 such as, without limitation, a display unit, a printer, a speaker, or the like.

The applications subsystems 330 may facilitate communications to and from the processing system 300. The applications subsystem 330 may include, without limitation, a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The applications subsystems 330 may permit data to be exchanged with a network, other computer or processing systems, and/or any other devices. In certain embodiments, applications subsystems 330 may include hardware, software, and/or firmware that may be used to interface to an application or service/microservice.

The storage subsystem 340 shown in FIG. 3, which may be coupled to the bus 305, may provide a computer readable storage medium for storing information and code (instructions) that can be executed by the one or more processors 310. For example, the storage subsystem 340 may be configured to store basic programming and data constructs (see, e.g., program(s) 348) that provide the functionality of embodiments of this disclosure. According to an embodiment of the present disclosure, software code instructions or modules implementing the functionality of the present disclosure may be included as part of the storage subsystem 340 (e.g., as part of the program(s) 348). These software modules may be executed by one or more of the processors 310. The storage subsystem 340 may also provide a repository for storing data used in accordance with aspect of this disclosure (see, e.g., application(s) data 346). Any potential computer readable storage medium of the storage subsystem 340 may include a transitory computer readable storage medium and/or a non-transitory computer readable storage medium. The storage subsystem may include one or more OSs 344. One or more of the elements of the storage subsystem 340 (potentially inclusive of the OSs 344, the applications(s) data 346, and/or the program(s) 348) may be included or incorporated as part of one or more memories/memory devices, such as the memory 342. Aspects of the memory 342 may correspond to, e.g., the tree 104 and/or the memory device 108 of FIG. 1.

In some embodiments, the storage subsystem 340 (e.g., the memory 342) may include a number of memories such as a main random access memory (RAM) for storage of instructions and data during program execution, a read only memory (ROM) in which fixed instructions are stored, flash memory, and the like. Various software elements may be located within the storage subsystem 340, such as device drivers, executable libraries, and/or other code.

The storage subsystem 340 may include a persistent or long-term storage device 354. Aspects of the persistent storage device 354 may correspond to, e.g., the persistent storage 112 of FIG. 1. The storage subsystem 340 (e.g., the persistent storage 354) may provide persistent (non-volatile) storage for program and data files, and may include a hard disk drive, a floppy disk drive along with associated removable media, a Compact Disk Read Only Memory (CD-ROM) drive, an optical drive, removable media cartridges, local and/or network accessible storage, and other like storage media.

By convention, terms such as "first," "second," "third," and so forth, as used in the claims, unless otherwise clear by context, is for clarity only and does not otherwise indicate or imply any order.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details.

What is claimed is:

1. A non-transitory computer readable storage medium storing executable instructions that, when executed by a processing system, facilitate a performance of operations, the operations comprising:
   identifying a plurality of parameters for managing data in relation to an execution of an application;
   monitoring access to the data;
   determining, based on the monitoring, that first data that is located in a memory of the processing system has not been accessed in an amount of time that is greater than a first threshold, resulting in a first determination;
   determining, based on the plurality of parameters and the first determination, that the first data is a candidate for transfer to a persistent storage device, resulting in a second determination;
   based on the second determination, causing the first data to be transferred to the persistent storage device;
   determining, based on the monitoring, that second data that is located in the memory has not been accessed in an amount of time that is greater than the first threshold, resulting in a third determination;
   determining, based on the plurality of parameters and the third determination, that the second data is not a candidate for transfer to the persistent storage device, resulting in a fourth determination; and
   causing the second data to be retained in the memory based on the fourth determination.

2. The non-transitory computer readable storage medium of claim 1, wherein the persistent storage device includes a disk.

3. The non-transitory computer readable storage medium of claim 1, wherein the operations further comprise:
   determining, based on the monitoring, that third data that is located in the memory of the processing system has not been accessed in an amount of time that is greater than a second threshold, resulting in a fifth determination;
   determining, based on the plurality of parameters and the fifth determination, that the third data is a candidate for transfer to the persistent storage device, resulting in a sixth determination; and
   based on the sixth determination, causing the third data to be transferred to the persistent storage device.

4. The non-transitory computer readable storage medium of claim 3, wherein the second threshold is different from the first threshold.

5. The non-transitory computer readable storage medium of claim 1, wherein the causing the first data to be transferred to the persistent storage device includes modifying a format of the first data from a first format to a second format that is different from the first format.

6. The non-transitory computer readable storage medium of claim 5, wherein the modifying of the format includes serializing the first data.

7. The non-transitory computer readable storage medium of claim 5, wherein the modifying of the format includes encrypting the first data.

8. The non-transitory computer readable storage medium of claim 5, wherein the modifying of the format includes compressing the first data.

9. The non-transitory computer readable storage medium of claim 1, wherein the plurality of parameters includes at least one parameter associated with a specification or a requirement of the application.

10. The non-transitory computer readable storage medium of claim 1, wherein the plurality of parameters includes at least one parameter that is identified in accordance with a user-generated input.

11. The non-transitory computer readable storage medium of claim 1, wherein the plurality of parameters includes at least one parameter that is identified in accordance with machine learning or artificial intelligence.

12. The non-transitory computer readable storage medium of claim 1, wherein the first data is included as part of a relational schema that includes third data and fourth data.

13. The non-transitory computer readable storage medium of claim 12, wherein the relational schema includes a hierarchical tree, a relational database, or a combination thereof.

14. The non-transitory computer readable storage medium of claim 12, wherein the operations further comprise:
   determining that the third data is a descendent of the first data as part of the relational schema, resulting in a fifth determination; and
   causing the third data to be transferred to the persistent storage device based on the fifth determination.

15. The non-transitory computer readable storage medium of claim 12, wherein the operations further comprise:
   determining that the first data is a descendant of the fourth data as part of the relational schema, resulting in a fifth determination; and
   causing the fourth data to be retained in the memory based on the fifth determination.

16. A method comprising:
   monitoring, by a processing system including a processor, access to data that is related to a provisioning of a service or a microservice;
   determining, by the processing system and based on the monitoring, that first data of the data that is associated with an access attempt is resident in a storage device that is external to the processing system, resulting in a first determination;

determining, by the processing system and based on the first determination, that second data of the data is a descendent of the first data, resulting in a second determination;

based on the second determination, causing, by the processing system, the first data and the second data to be transferred from the storage device to a memory of the processing system;

determining, based on the monitoring, that third data of the data that is located in the memory has not been accessed in an amount of time that is greater than a first threshold, resulting in a third determination;

determining, based on a plurality of parameters for managing the data and the third determination, that the third data is not a candidate for transfer to the storage device, resulting in a fourth determination; and causing the third data to be retained in the memory based on the fourth determination.

17. The method of claim 16, further comprising:

obtaining, by the processing system and based on the causing of the first data and the second data to be transferred from the storage device to the memory of the processing system, the first data the second data; and causing, by the processing system and based on the obtaining, the first data and the second data to be incorporated as part of a relational schema that includes fourth data, wherein the first data is a descendant of the fourth data.

18. A device comprising:

a processing system including a processor; and a memory storing instructions that, when executed by the processing system, facilitate a performance of operations, the operations comprising:

determining that an access is not attempted with respect to first data associated with an execution of an application within a first threshold amount of time, resulting in a first determination;

determining, based on the first determination, that a policy associated with the application requires the first data to be retained in the memory, resulting in a second determination;

causing, based on the second determination, the first data to be retained in the memory;

determining that a second access is not attempted with respect to second data associated with the execution of the application within a second threshold amount of time, resulting in a third determination;

determining, based on the third determination, that the policy does not require the second data to be retained in the memory, resulting in a fourth determination; and transferring, based on the fourth determination, at least the second data to a storage device that is external to the processing system for storage.

19. The device of claim 18, wherein the transferring of the at least the second data comprises transferring third data, wherein the third data is a child of the second data as part of a relational schema that is implemented as a tree, and wherein the operations further comprise:

releasing resources of the memory that were allocated to a storage of the second data and the third data in the memory subsequent to the transferring.

20. The device of claim 18, wherein the second threshold amount of time is different from the first threshold amount of time.

* * * * *